United States Patent
Ramanathan et al.

(10) Patent No.: US 10,779,178 B1
(45) Date of Patent: Sep. 15, 2020

(54) SYSTEMS AND METHODS OF USING NETWORK SLICING FOR TEST PLATFORM

(71) Applicant: Verizon Patent and Licensing Inc., Arlington, VA (US)

(72) Inventors: Sankaran Ramanathan, Bridgewater, NJ (US); Charles Andrew Beltran, Parsippany, NJ (US); Gaurav B. Patel, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/689,385

(22) Filed: Nov. 20, 2019

(51) Int. Cl.
| | |
|---|---|
| *H04W 24/08* | (2009.01) |
| *H04W 8/24* | (2009.01) |
| *H04L 12/24* | (2006.01) |
| *H04W 8/04* | (2009.01) |

(52) U.S. Cl.
CPC ......... *H04W 24/08* (2013.01); *H04L 41/0843* (2013.01); *H04W 8/04* (2013.01); *H04W 8/245* (2013.01)

(58) Field of Classification Search
CPC ....... H04W 24/08; H04W 8/04; H04W 8/245; H04L 41/0843
See application file for complete search history.

(56) References Cited

U.S. PATENT DOCUMENTS

| | | | | |
|---|---|---|---|---|
| 9,307,397 | B2* | 4/2016 | Poon | H04W 12/06 |
| 9,420,554 | B1* | 8/2016 | Patel | H04W 60/00 |
| 2007/0280123 | A1* | 12/2007 | Atkins | H04W 24/00 |
| | | | | 370/252 |
| 2007/0291757 | A1* | 12/2007 | Dobson | H04L 43/50 |
| | | | | 370/392 |
| 2013/0196685 | A1* | 8/2013 | Griff | H04L 41/147 |
| | | | | 455/456.1 |

* cited by examiner

*Primary Examiner* — Md K Talukder

(57) ABSTRACT

Systems and methods provide on-demand network slicing to support testing of customer use cases A test network management system receives customer parameters for a use case in a production network. The customer parameters include an identifier for a user equipment (UE) device to be tested with the use case. The test network management system provides, to the UE device, configuration information to associate the UE device with a test mode network segment of the production network. A network device in the production network may receive a registration request, from the UE device, that includes the configuration information. Based on the configuration information, the network device blocks the UE device from accessing the production network. Instead, the test network management system initiates provisioning of the test mode network segment for the UE device; and the network device redirects the registration request to the test mode network segment.

20 Claims, 11 Drawing Sheets

SYSTEMS AND METHODS OF USING NETWORK SLICING FOR TEST PLATFORM

BACKGROUND INFORMATION

Providers of wireless communication services continue to improve and expand available wireless networks. One aspect of such improvements includes the development of core networks as well as options to utilize such core networks. A core network may manage a large number of devices and/or network functions experiencing different conditions. In a vendor-supplied network function environment, each vendor provides individual network functions that will be grouped into a logical and/or physical set of network functions that will comprise a network slice. The core network will employ point-to-point interfaces and service based architecture (SBA) interfaces for network functions to communicate with other network functions. New devices, products, and services that use wireless networks benefit from network testing, including core network testing, before being made available to customers.

DETAILED DESCRIPTION OF PREFERRED EMBODIMENTS

Figure 1:
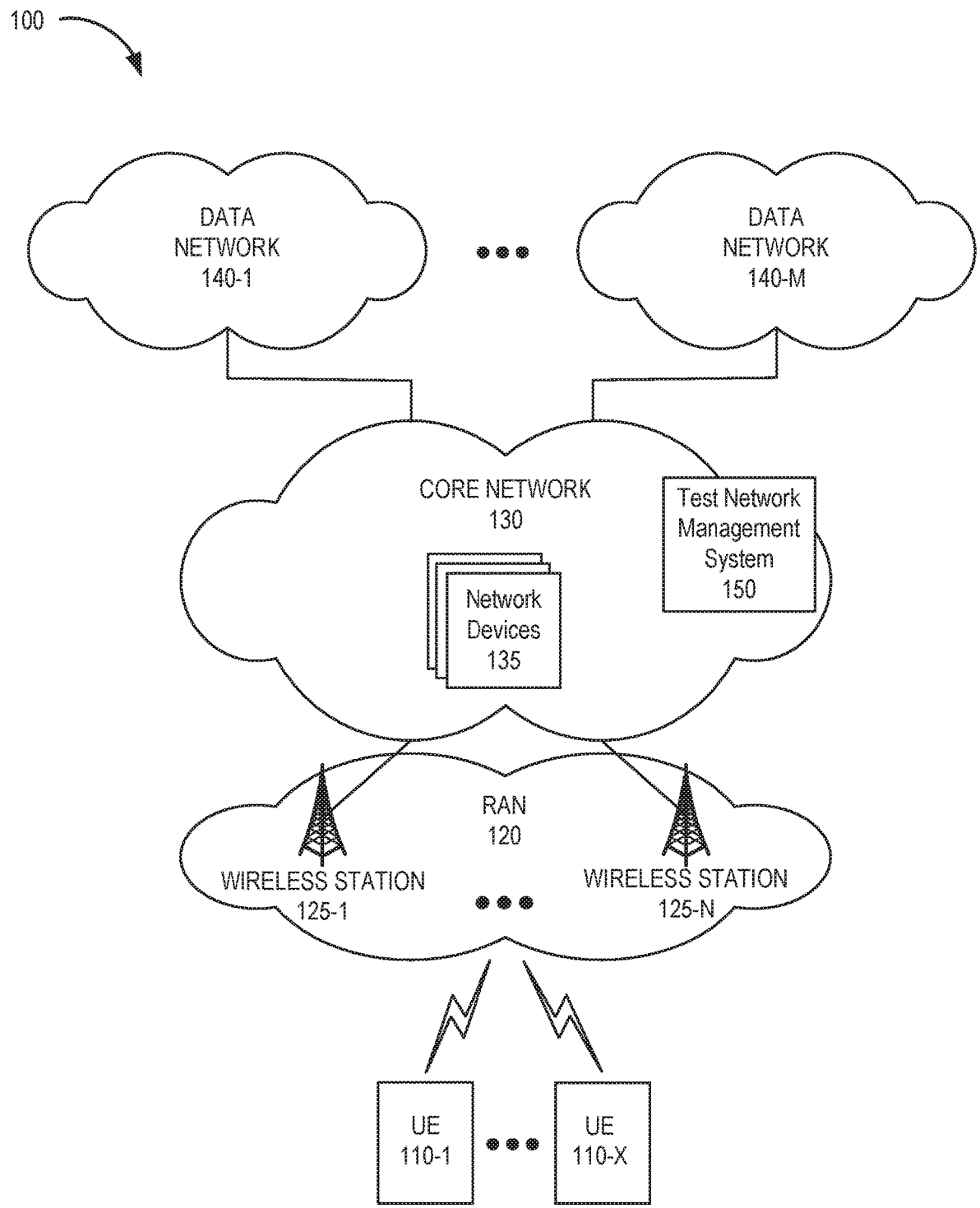
FIG. 1 is a diagram illustrating an environment according to an implementation described herein.

The following detailed description refers to the accompanying drawings. The same reference numbers in different drawings identify the same or similar elements.

Systems and methods described herein utilize physical resources in 5th Generation (5G) networks for on-demand lab-type testing of new devices, products, and services. More specifically, network slicing technology is used to provide lab-type testing over a segmented portion of a production network. The production network, as used herein, may refer to any portion of a wireless network used to support live or real-time data transport for subscribers. The lab testing segment may be implemented in a manner to not jeopardize services over the production network. Test loads and test configurations for a specific use case may be loaded to or removed from the network as necessary.

Testing for new devices, products, and services on wireless networks has traditionally been performed using a network lab infrastructure that attempts to simulate a production network (e.g., the actual network regularly used by customers). This testing approach may protect and preserve resources of the production wireless network. However, such off-network testing has several limitations, including, among others, the ability to accurately simulate network conditions and the cost of providing a separate testing infrastructure.

At most times, the capacity of a production network exceeds the required capacity for a current workload, generally leaving unused network capacity available during all but the busiest periods. Improvements in the core networks of 5G wireless access networks provide new functionality, including network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources. A network slice may be configured to implement a different set of requirements and/or priorities or may be associated with a particular Quality of Service (QoS) class, type of service, and/or particular customer associated with a set of user equipment (UE) devices. In order to implement functionality such as network slicing, a 5G core network may include various network nodes or modules, known as network functions (NFs).

According to an implementation, systems and methods described herein provide on-demand network slicing to support testing of customer use cases. A test network management system receives customer parameters for a use case in a production network. The customer parameters include, among others, an identifier for a UE device to be tested with the use case. The test network management system provides, to the UE device, configuration information to associate the UE device with a test mode network segment (e.g., a network slice) of the production network. The test mode network segment may use the same physical resources the production network would use to support the use case. A network device in the production network may receive a registration request, from the UE device, that includes the configuration information. Based on the configuration information, the network device blocks the UE device from accessing the production network. Instead, the test network management system initiates provisioning of the test mode network segment for the UE device; and the network device redirects the registration request to the test mode network segment.

Implementations described herein enable a portion of a production network to be carved out or segmented to test new devices, new software releases, new services, etc. Testing may be performed over real-world environments and with real-world latency conditions over backhaul networks that cannot be simulated in lab conditions. Also, according to an implementation, the test network management system can provision and control which UE devices will have access to network testing slices.

FIG. 1 is a diagram of an exemplary environment 100 in which the systems and/or methods, described herein, may be implemented. As shown in FIG. 1, environment 100 may include UE devices 110-1 to 110-X (referred to herein collectively as "UE devices 110" and individually as "UE device 110"), a radio access network (RAN) 120, a core network 130, data networks 140-1 to 140-M, and a test network management system 150.

UE device 110 may include any device with long-range (e.g., cellular or mobile wireless network) wireless communication functionality. For example, UE device 110 may include a handheld wireless communication device (e.g., a mobile phone, a smart phone, a tablet device, etc.), a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player, a WiFi access point, a smart television, etc.; a portable gaming system; global positioning system (GPS) device; a home appliance device; a home monitoring device; a telematics device; and/or any other type of computer device with wireless communication capabilities. UE device 110 may include capabilities for voice communication, mobile broadband services (e.g., video streaming, real-time gaming, premium Internet access etc.), best effort data traffic delivery, and/or other types of capabilities. In some implementations, UE device 110 may communicate using machine-to-machine (M2M) communication, such as machine-type communication (MTC), and/or another type of M2M communication.

RAN 120 may enable UE devices 110 to connect to core network 130 for mobile telephone service, Short Message Service (SMS), Multimedia Message Service (MMS), Internet access, cloud computing, and/or other types of data services. RAN 120 may include wireless stations 125-1 to 125-N (referred to herein collectively as "wireless stations 125" and individually as "wireless station 125"). Each wireless station 125 may service a set of UE devices 110. For example, wireless station 125-1 may service some UE devices 110 when the UE devices 110 are located within the geographic area serviced by wireless station 125-1, while other UE devices 110 may be serviced by another wireless station 125 when the UE devices 110 are located within the geographic area serviced by the other wireless station 125.

Wireless station 125 may include a 5G base station (e.g., a next generation NodeB) that includes one or more radio frequency (RF) transceivers facing particular directions. Each RF transceiver may include an antenna array. The antenna array may include an array of controllable antenna elements configured to send and receive 5G New Radio (NR) wireless signals via one or more antenna beams. A particular antenna beam may service multiple UE devices 110. In some implementations, wireless station 125 may also include a 4G base station (e.g., an eNodeB). Furthermore, in some implementations, wireless station 125 may include a Multi-Access Edge Computing (MEC) (also referred to as Mobile Edge Computing) system that performs cloud computing and/or provides network processing services for UE devices 110.

Core network 130 may manage communication sessions for UE devices 110. Core network 130 may provide mobility management, session management, authentication, and packet transport, to support UE device 110 and wireless station 125 wirelessly communicating using, for example, a dual connectivity, multi-Radio Access Technology (RAT) configuration. Core network 130 may further provide access to data networks 140. Core network 130 may be compatible with known wireless standards which may include, for example, 3GPP 5G, Long Term Evolution (LTE), LTE Advanced, Global System for Mobile Communications (GSM), Universal Mobile Telecommunications System (UMTS), IS-2000, etc. For example, core network 130 may establish an Internet Protocol (IP) connection between UE device 110 and a particular data network 140. Core network 130 may include various types of network devices 135, which may implement different network functions described further herein.

Data networks 140-1 to 140-M (referred to herein collectively as "data networks 140" and generically as "data network 140") may each include a packet data network. A particular data network 140 may include, and/or be connected to and enable communication with, a local area network (LAN), a wide area network (WAN), a metropolitan area network (MAN), an optical network, a cable television network, a satellite network, a wireless network, an intranet, or a combination of networks. Some or all of a particular data network 140 may be managed by a communication services provider that also manages core network 130, RAN 120, and/or particular UE devices 110. For example, in some implementations, a particular data network 140 may include an IP Multimedia Sub-system (IMS) network. An IMS network may include a network for delivering IP multimedia services and may provide media flows between two different UE devices 110, and/or between a particular UE device 110 and external IP networks or external circuit-switched networks.

Test network management system 150 may include one or more network devices (e.g., such as network devices 135 or other network devices) that provide on-demand network slicing to support testing of customer use cases. Test network management system 150 is described further in connection with, for example, FIG. 3A.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
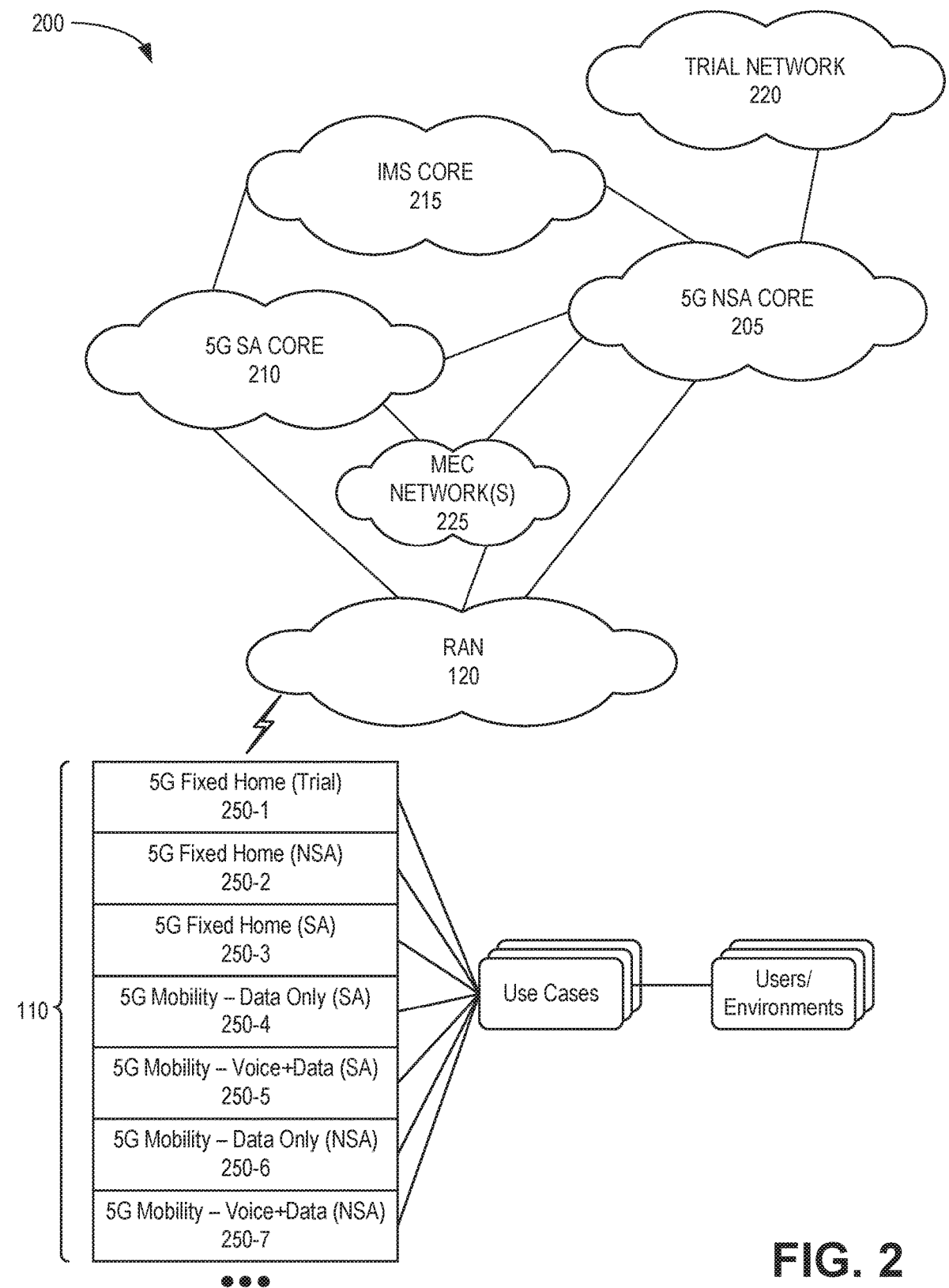
FIG. 2 is a diagram illustrating test combinations that may be used with lab-type testing over a segmented portion of a production network, according to implementations described herein.

FIG. 2 is a diagram of a portion 200 of network environment 100 that illustrates test combinations that may be used with lab-type testing over a segmented portion of a production network, according to an implementation described herein. As shown in FIG. 2, network portion 200 may include UE devices 110, RAN 120, a 5G non-standalone (NSA) core 205, a 5G standalone (SA) core 210, an IMS core 215, a trial network 220, and a MEC network 225.

5G NSA core 205 may include network devices that support dual coverage for UE devices 110. That is, some communications will commence over a 4G network and other portions of the communications may use a portion of a 5G network. 5G SA core 210 may support 5G-capable UE devices 110 that do not need to rely on 4G wireless stations to establish 5G connectivity. IMS core 215 may include components for providing IP multimedia services and for administering data exchanges between RAN 120 and a data network 140 (not shown). Trial network 220 may include a pre-production network or portion of a core network to support, for example, developing network standards. MEC network 225 may include a platform that provides application services, such as low latency services, at the edge of a wireless network. Generally 5G NSA core 205, 5G SA core 210, IMS core 215, trial network 220, and a MEC network 225 represent different types of networks that may provide user experiences, service levels, etc., for different types of users.

UE devices 110 may include devices with multiple technology types 250, such as 5G fixed home devices 250-1 that are configured for a trial network, 5G fixed home devices 250-2 that are configured for an NSA 5G network, 5G fixed home devices 250-3 that are configured for an SA 5G network, 5G mobility devices 250-4 that are configured for data only over an SA 5G network, 5G mobility devices 250-5 that are configured for voice and data over an SA 5G network, 5G mobility devices 250-6 that are configured for data only over an NSA 5G network, and 5G mobility devices 250-7 that are configured for voice and data over an NSA 5G network.

Each of technology types 250 may be associated with different use cases and different customers/environments. Different use cases may require different service level requirements for the same technology type 250. For example, a use case involving self-driving vehicles may have a different service level requirement than a remote classroom application. Furthermore, different customers having different requirements may be associated with the same use case. For example, consumers, businesses, and government users may have different requirements and/or geographical constraints for similar use cases. Thus, the different combinations of networks, technology types, user cases, and customers present a multitude of test scenarios. Implementations described herein use network slicing to allow testing of different combinations on a segmented portion of a production network.

Figure 3A:
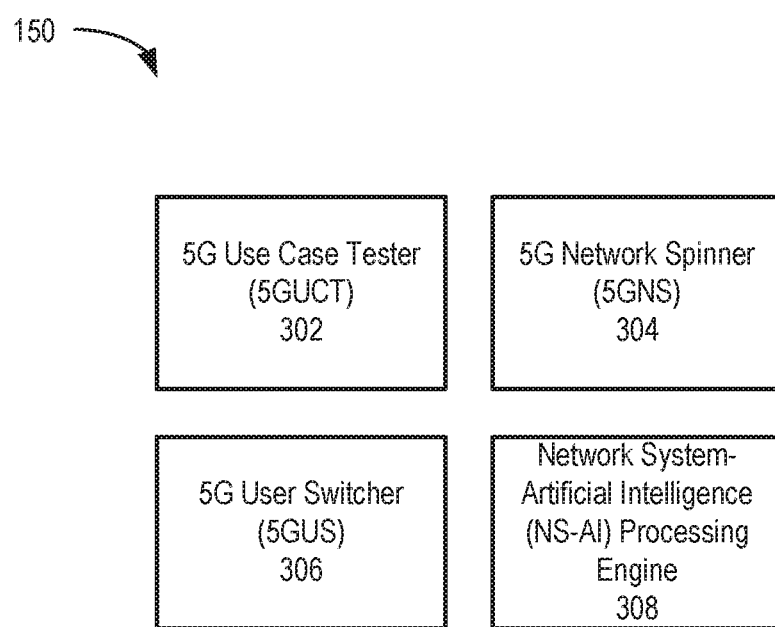
FIG. 3A is a block diagram illustrating exemplary components of the test network management system of FIG. 1.

FIG. 3A is a block diagram illustrating exemplary components of test network management system 150. As shown in FIG. 3, test network management system 150 may include a 5G use case tester (5GUCT) 302, a 5G network spinner (5GNS) 304, a 5G user switcher (5GUS) 306, and a network system-artificial intelligence (NS-AI) engine 308. Each of 5GUCT 302, 5GNS 304, 5GUS 306, and NS-AI engine 308 may be implemented, for example, in one or more network devices 135. In another implementation, on or more of 5GUCT 302, 5GNS 304, 5GUS 306, or NS-AI engine 308 may be implemented in network devices outside of core network 130. In some implementations, one or more of 5GUCT 302, 5GNS 304, 5GUS 306, and NS-AI engine 308 may be combined in a single network device 135 or distributed throughout a group of network devices 135.

5GUCT 302 serves as a controller for arranging lab-type testing over a segmented portion of a production network. 5GUCT 302 may solicit and receive input from a customer to identify a parameters for particular test mode environment that will be implemented in a segment of network portion 200. Customer parameters include, for example, a slice ID of a network segment to be simulated/tested, a duration/ expiration period for the testing; and identifiers for UE devices 110 to be tested with the use case. 5GUCT 302 may provide parameters to 5GNS 304 for instantiation and provisioning of test mode network segments. 5GUCT 302 may also provide parameters to 5GUS 306 for controlling which UE devices 110 will have access to the test mode network segments.

5GNS 304 may receive instructions from 5GUCT 302 and initiate on-demand provisioning of test mode environments. For example, 5GNS 304 may initiate instantiation of test mode network segments when a UE device 110 (e.g., after configuration by 5GUS 306) first requests access to a test slice. Based on parameters from 5GUCT 302, 5GNS 304 may prepare a spin request for network devices to execute, such as provisioning a virtual instance of a unified data management (UDM) function, a home subscriber server (HSS), and/or a policy server (PS) for a test mode environment. 5GNS 304 may also receive feedback from NS-AI engine 308 and deactivate or modify test mode network segments that impact services of production network. This action may free up capacity on physical resources to ensure enough availability for production traffic and outage prevention. Similarly, 5GNS 304 may re-activate or modify a test mode network segment when capacity limits or risk of outages are no longer present.

5GUS 306 may coordinate with 5GUCT 302 to provision selected UE devices 110 for use of a test mode environment. For example, a customer may identify particular UE devices 110 or groups of devices (e.g., test devices or consumer devices) to access a test mode environment. 5GUCT 302 may provide a switch request to 5GUS 306 to initiate switching the designated UE devices 110 from, for example, production network access to test mode environment access. 5GUS 306 may provide instructions (e.g., a Short Message Service (SMS) push) to selected UE devices 110 for the UE devices 110 to initiate network registration in the test mode environment.

NS-AI engine 308 may receive network feedback of network functions and devices in each test mode environment. For example, NS-AI engine 308 may receive data from various network tracers and UE devices 110 that can be used to provide results and/or comparisons of different customized network deployments (CNDs) with a test mode environment (TME), such as TME1CND-1, TME1CND2, etc. Results/comparisons may be provided to or otherwise made accessible to customers and/or network administrators. Additionally, NS-AI engine 308 may also provide health check data to 5GNS 304, which may be use for automated healing (or self-healing) of the network slices.

NS-AI processing engine 308 may also monitor to ensure test mode network segments do not limit needed capacity in the production network. For example, when a certain capacity threshold is reached on a physical resource (e.g., that is shared by a test mode network segments), NS-AI engine 308 may notify 5GNS 304. NS-AI engine 308 may also predict and/or notify 5GNS 304 of capacity choke points and high consumption devices in a test mode network segment. According to an implementation, NS-AI engine 308 may also identify the best geographical location for network deployment of a test mode environment to meet given use case latency requirements by utilizing data mined from real world results and various trials.

While FIG. 3A shown exemplary components of test network management system 150, in other embodiments, test network management system 150 may include more, fewer, or different components. For example, in other implementations, some functions described in connection with one component of test network management system 150 may be performed by a different component of test network management system 150. Interactions and communications between components of test network management system 150 are described further in connection with FIGS. 3B-5B.

Figure 3B:
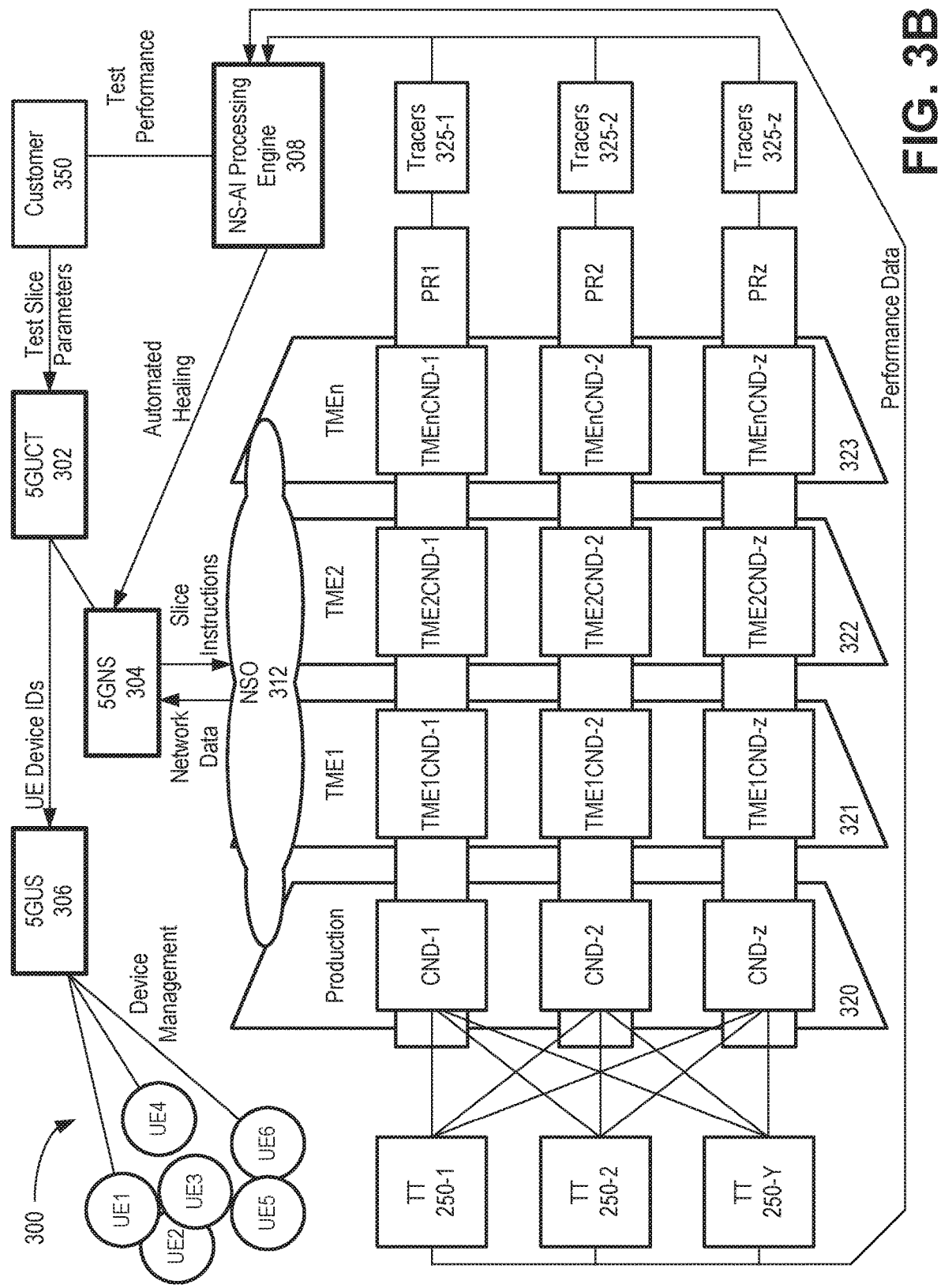
FIG. 3B is a diagram illustrating a portion of the network environment of FIG. 1 that illustrates lab-type testing over a segmented portion of a production network, according to an implementation described herein.

FIG. 3B is a diagram of a portion 300 of network environment 100 that illustrates lab-type testing over a segmented portion of a production network, according to an implementation. Communications and connections shown in FIG. 3B are simplified for illustrative purposes. Network portion 300 may include 5GUCT 302, 5GNS 304, 5GUS 306, NS-AI engine 308, network slice orchestration (NSO) function 312. Network portion 300 may further include horizontal slices, illustrated as customized network deployments (e.g., CND-1, CND-2, . . . CND-z) and vertical slices, illustrated as a parts of production segment 320 and test mode environments 321, 322, and 323 (e.g., TME1, TME2, . . . TMEn). Each customized network deployment may be tied to physical resources (PR) locations (e.g., PR1, PR2, . . . PRz).

NSO function 312 may create network slices for both production and testing. NSO function 312 may receive instructions/requests from 5GNS 304 to implement test mode network segments. NSO function 312 may automate sequences of activities, tasks, rules, and policies needed for on-demand creation, modification, or removal of network slices. NSO function 312 may provide orchestration at a high level, with an end-to-end view of the infrastructure, networks (e.g., RAN 120 and core network 130), and applications. NSO function 312 may be responsible for implementing instructions to instantiate, allocate, and activate production segment 320 and test mode environments 321, 322, and 323. Similarly, NSO function 312 may be responsible for implementing instructions to deactivate, deallocate, and tear down production segment 320, and test mode environments 321, 322, or 323.

Tracers 325 may collect network data from devices and functions in test mode environments. Tracers 325 may include, for example, real-time tracing for RAN and CND functions. Tracers 325 may log network data (e.g. segment latencies, packet loss, etc.) for functions in each test mode environment. Tracers 325 may provide network data to NS-AI engine 308. Although only three tracers 325 are shown in FIG. 3B, tracers 325 may be included at other locations in network portion 300. Additionally, technology types 250 may log performance data and may provide the performance data to NS-AI engine 308.

Customer device 350 may include any type of computing or communication device to provide user input to 5GUCT 302. According to an implementation, customer device 350 may access 5GUCT 302 via a portal or secure web interface. Customer device 350 may be used, for example, to provide parameters to 5GUCT 302 for test mode network segments.

In an aspect of test network management system 150, customer device 350 may provide to 5GUCT 302 test slice parameters for creating a new test slice (e.g., TME1, TME2, etc.) that matches production segment 320. 5GUCT 302, in turn, may provide to 5GUS 306 a list of UE devices 110 that are to be used on the test slice. 5GUS 306 may use device management procedures (described further below) to configure selected UE devices 110 (e.g., any of UE1 to UE6 in FIG. 3B) for test slice access. When one of UE devices 110 requests network access (not shown in FIG. 3B), 5GUCT 302 may also be prompted to provide a test slice configuration to 5GNS 304. 5GNS 304 may use the configuration information from 5GUCT 302 to obtain network data from NSO function 312 and generate test slice instructions to create/provision a test slice (e.g., one of TME1 321, TME2 322, etc.), which may be deployed on the same physical resources used for the production slice 320.

Once connected to a test slice, UE devices 110, represented as technology type (TT) 250 in FIG. 3B, may transmit and receive data through their respective test slice. Each TT 250 and tracers 325 may collect latency and other performance data that is provided to NS-AI engine 308. NS-AI engine 308 may generate comparisons and/or results that can be accessed by customer device 350. Additionally, NS-AI engine 308 may use the latency and other performance data to detect test slice (or production network) problems and provide automated healing information to 5GNS 304, such as particular TME fixes for issues of high latency for UE devices 110.

Figure 4A:
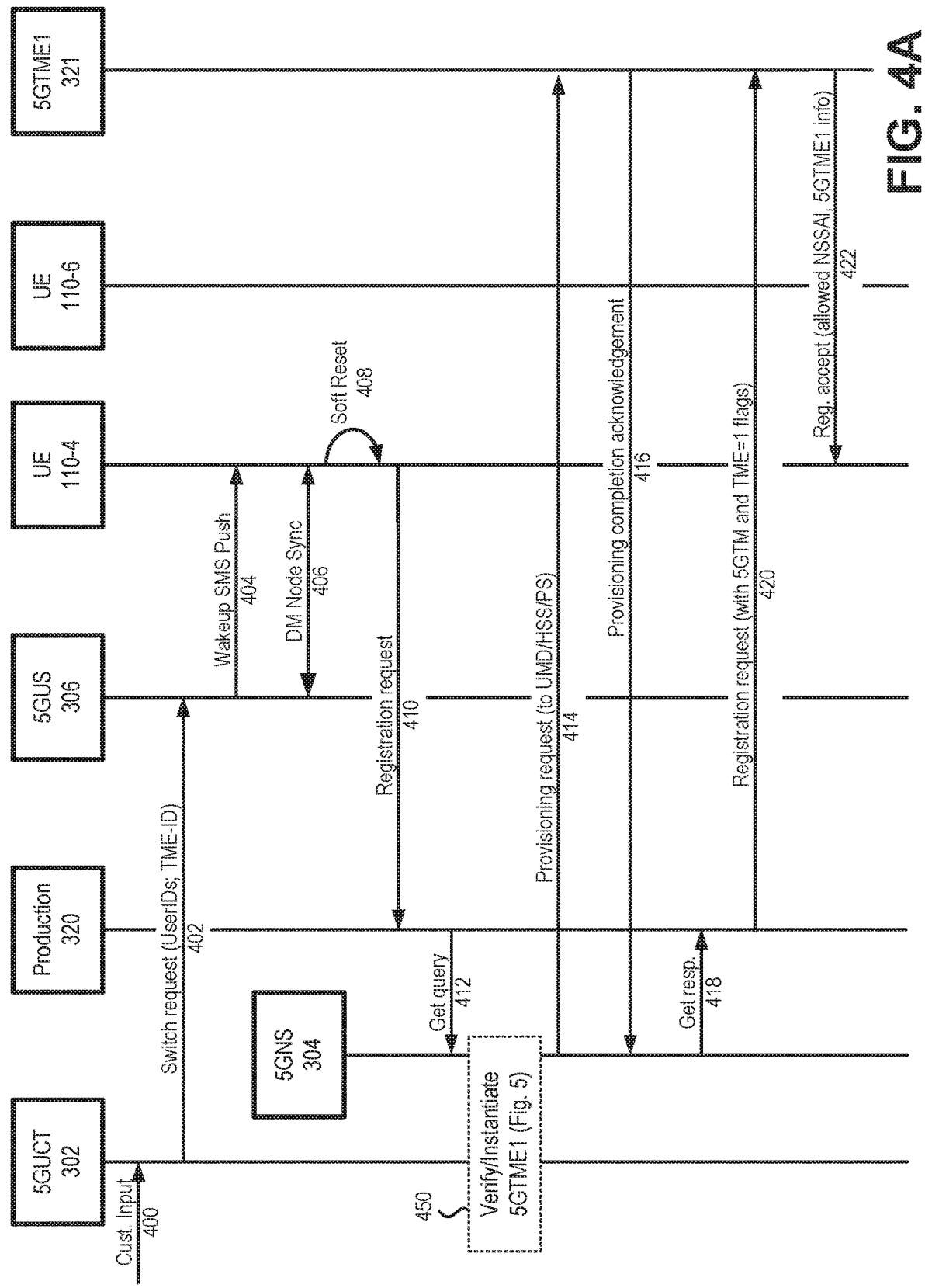
FIGS. 4A-4B are signal flow diagrams illustrating communications for assigning user equipment (UE) devices to operate in a test mode environment.
Figure 4B:
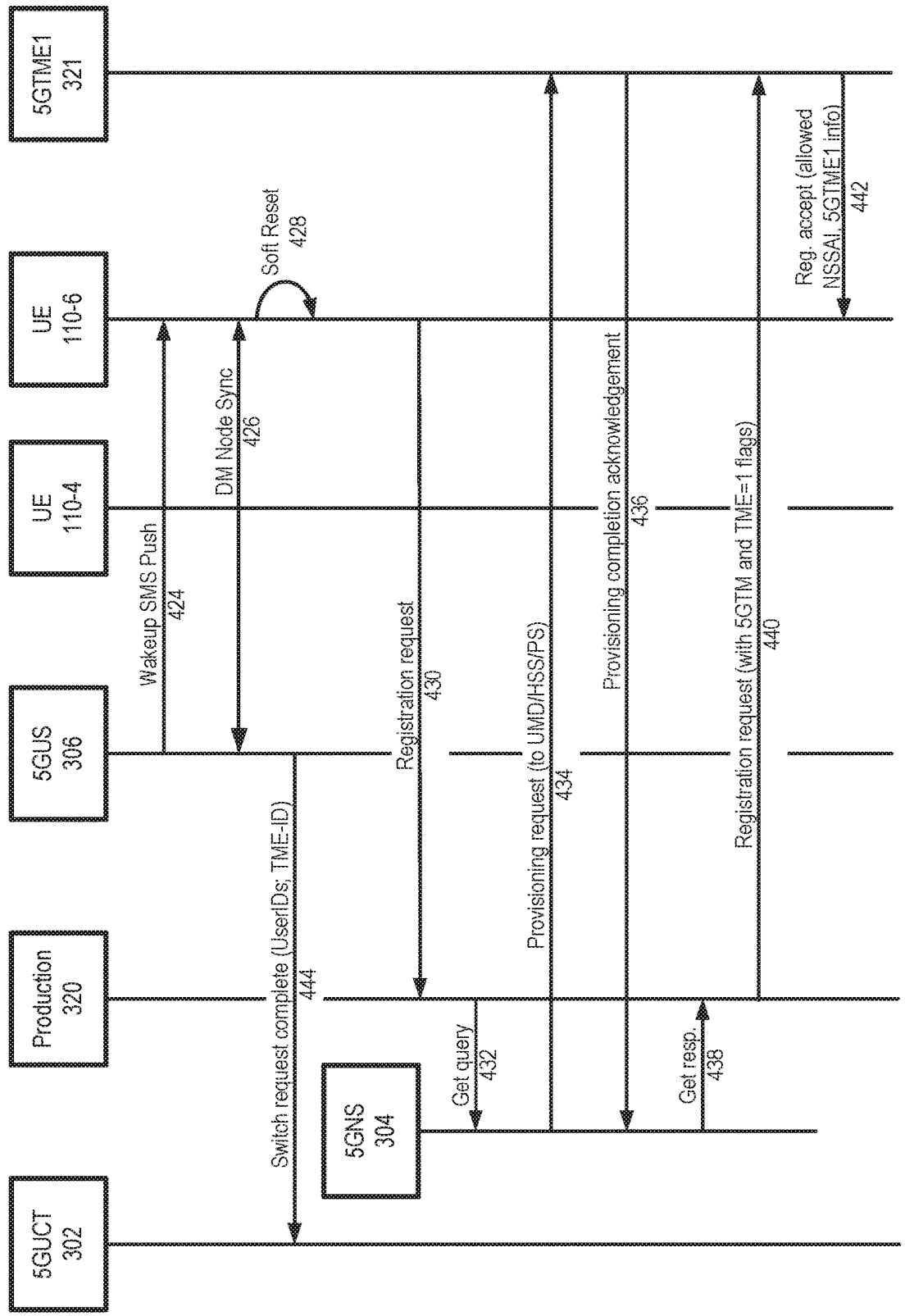

FIGS. 4A and 4B are signal flow diagrams illustrating communication among some components of network portion 300. FIGS. 4A and 4B provide simplified illustrations of communications and are not intended to reflect every signal or communication exchanged between devices/functions. Communications in FIGS. 4A and 4B relate to assigning UE devices to operate in a test mode environment.

As shown in FIG. 4A, a customer (e.g., using customer device 350) may request initiation of a test environment for use with designated UE devices 110-4 and 110-6. The test environment may include particular resources, such as CND-1, CND-2, etc., and test loads. The customer may provide identifiers for the particular UE devices 110 and network configuration to 5GUCT 302 as customer input 400. In response to the customer input 400, 5GUCT 302 may send a switch request 402 to 5GUS 306. Switch request 402 may identify the UE devices 110 to be switched to a particular test mode environment. Switch request 402 may include a user ID for each of UE devices 110-4 and 110-6 (e.g., an International Mobile Equipment Identity (IMEI), an International Mobile Subscriber Identity (IMSI), a Mobile Directory Number (MDN), etc.) and an identifier for the designated test mode environments (e.g., TME1).

5GUS 306 may receive switch request 402 and, in response, generate a push notification to each of the UE devices 110 indicated in switch request 402 (e.g., UE devices 110-4 and 110-6). Thus, 5GUS 306 may send wakeup SMS Push 404 to UE device 110-4 and wakeup SMS Push 424 (FIG. 4B) to UE device 110-6.

UE device 110-4 may receive wakeup SMS Push 404 and initiate a device management (DM) node synchronization procedure 406. DM node synchronization procedure 406 may set a test mode flag (e.g., 5GTM=On) and set a particular test mode environment (e.g., TME flag=1) for UE device 110-4. Completion of DM node synchronization procedure 406 may initiate a soft reset procedure 408 for UE device 110-4. During soft reset procedure 408 the test mode flag (e.g., 5GTM=On) and test mode environment ID flag (e.g., TME flag=1) will become active for UE device 110-4.

Soft reset procedure 408 may trigger a registration request 410 by UE device 110-4. For example, UE device 110-4 may initiate a Radio Resource Control (RRC) Connection Request via a wireless station 125. The RRC Connection Request may include network slice selection assistance information (NSSAI) for UE device 110-4 that is associated with production segment 320. Alternatively, NSSAI may be missing from the RRC Connection Request. Registration request 410 may be directed to production segment 320 (e.g., a local access management function (AMF)) and may include the test mode flag (e.g., 5GTM=On) and test mode environment ID flag (e.g., TME flag=1) assigned to UE device 110-4. Production segment 320 may receive registration request 410 and may detect the test mode flag. Since the test mode flag blocks access to the production network, production segment 320 may attempt to forward registration request 410 to the correct test network (e.g., based on the test mode environment ID flag) by sending a query 412 to 5GNS 304 for a reallocation procedure. Query 412 may include the test mode flag (e.g., 5GTM=On) and the test mode environment ID flag (e.g., TME flag=1) for UE device 110-4.

5GNS 304 may receive query 412 and may detect the test mode flag (e.g., 5GTM=On) and the test mode environment ID flag (e.g., TME flag=1). Based on TME flag=1, 5GNS 304 may verify that 5GTME1 network exists. For example, assuming that UE device 110-4 is the first device to request access to the test network, 5GTME1 321 may not have been previously formed. Thus, as indicated at reference 450 and described below in connection with FIG. 5A, 5GNS 304 may coordinate with 5GUCT 302 to instantiate 5GTME1 321. Once 5GTME1 321 is created/verified, 5GNS 304 may trigger provisioning of 5GTME1 321 for UE device 110-4. 5GNS 304 may send a provisioning request 414 to a unified data management (UDM) function, a home subscriber server (HSS), and/or a policy server (PS) for 5GTME1 321. Upon successful provisioning of the 5GTME1 321 for UE device 110-4, 5GNS 304 may receive a provisioning completion acknowledgement 416, allowing 5GNS 304 to provide a response 418 to production segment 320. Response 418 may include, for example, a network address for accessing the 5GTME1 321.

Production segment 320 may receive response 418 and send a registration request 420 to 5GTME1 321. Registration request 420 may include the test mode flag (e.g., 5GTM=On) and test mode environment ID flag (e.g., TME flag=1) assigned to UE device 110-4. 5GTME1 321 may receive registration request 420 and, in response, may provide a registration accept message 422 to UE device 110-4. Registration accept message 422 may include, for example, network slice selection assistance information (NSSAI) and a particular AMF to serve UE device 110-4 on 5GTME1 321.

Referring to FIG. 4B, UE device 110-6 may receive wakeup SMS Push 424 and initiate a DM node synchronization procedure 426. DM node synchronization procedure 426 may set the test mode flag (e.g., 5GTM=On) and the particular test mode environment (e.g., TME flag=1) for UE device 110-4. Completion of DM node synchronization procedure 426 may initiate a soft reset procedure 428 for UE device 110-6. During soft reset procedure 428 the test mode flag (e.g., 5GTM=On) and test mode environment ID flag (e.g., TME flag=1) will become active for UE device 110-6.

Upon detecting completion of DM node synchronization procedure 426, along with previous completion of DM node synchronization procedure 406, 5GUS 306 may provide a switch request completion message 444 to 5GUCT 302 to confirm that UE device 110-4 and 110-6 have been switched to 5GTME1 321. Switch request completion message 444 may include, for example, the user IDs and test mode environment ID from switch request 402.

Soft reset procedure 428 may trigger a registration request 430 by UE device 110-6. Registration request 430 may be directed to production segment 320 (e.g., a local AMF) and may include the test mode flag (e.g., 5GTM=On) and test mode environment ID flag (e.g., TME flag=1) assigned to UE device 110-6. Production segment 320 may receive registration request 430 and may detect the test mode flag. Since the test mode flag blocks access to the production network, production segment 320 may attempt to forward registration request 430 to the correct test network (e.g., based on the test mode environment ID flag) by sending a query 432 to 5GNS 304 for a reallocation procedure. Query 432 may include the test mode flag (e.g., 5GTM=On) and the test mode environment ID flag (e.g., TME flag=1) for UE device 110-6.

5GNS 304 may receive query 432 and may detect the test mode flag (e.g., 5GTM=On) and the test mode environment ID flag (e.g., TME flag=1). Based on TME flag=1, 5GNS 304 may verify that a 5GTME1 network exists. In the example of FIGS. 4A and 4B, a request from UE device 110-4 has already initiated formation of 5GTME1 321. Thus, 5GNS 304 will recognize the test mode environment ID flag and trigger provisioning of 5GTME1 321 for UE device 110-6. 5GNS 304 may send a provisioning request 434 to a UDM, HSS, or PS for 5GTME1 321. Upon successful provisioning of the 5GTME1 321 for UE device 110-6, 5GNS 304 may receive a provisioning completion acknowledgement 436, allowing 5GNS 304 to provide a response 438 to production segment 320. Response 438 may include, for example, a network address for accessing the 5GTME1 321.

Production segment 320 may receive response 438 and send a registration request 440 to 5GTME1 321. Registration request 440 may include the test mode flag (e.g., 5GTM=On) and test mode environment ID flag (e.g., TME flag=1) assigned to UE device 110-6. 5GTME1 321 may receive registration request 440 and, in response, may provide a registration accept message 442 to UE device 110-6. Registration accept message 442 may include, for example, network slice selection assistance information (NSSAI) and a particular AMF to serve UE device 110-6 on 5GTME1 321.

Communications shown in FIGS. 4A and 4B show an initial switch for UE devices 110 from a production network to a test mode network segment. In other implementations similar communications may be used to assign UE devices 110 from one test mode network segment to another, to multiple test mode network segments, or to different combinations of test mode network segments.

Figure 5A:
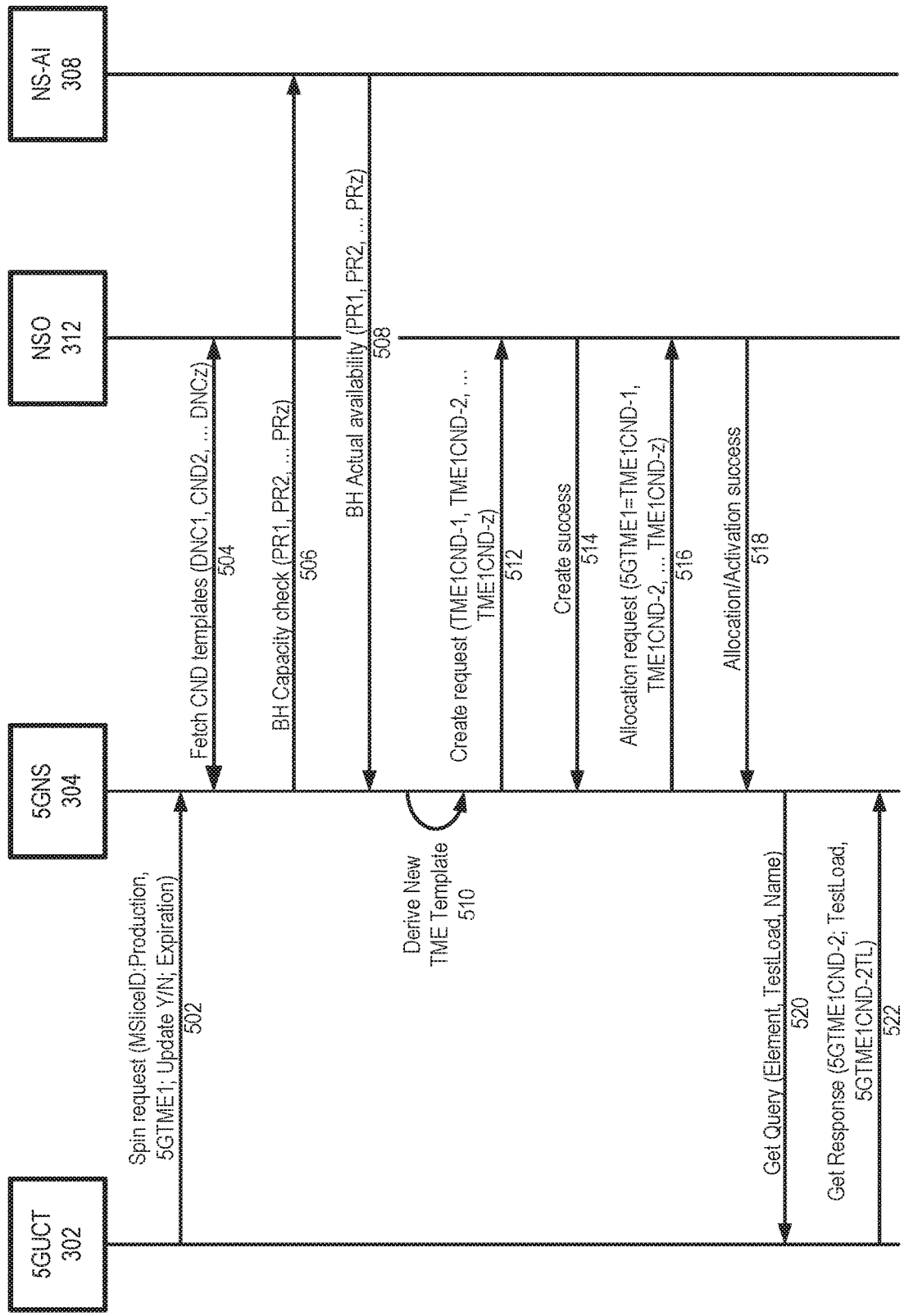
FIGS. 5A-5B are signal flow diagrams illustrating communications for instantiating a test mode environment.
Figure 5B:
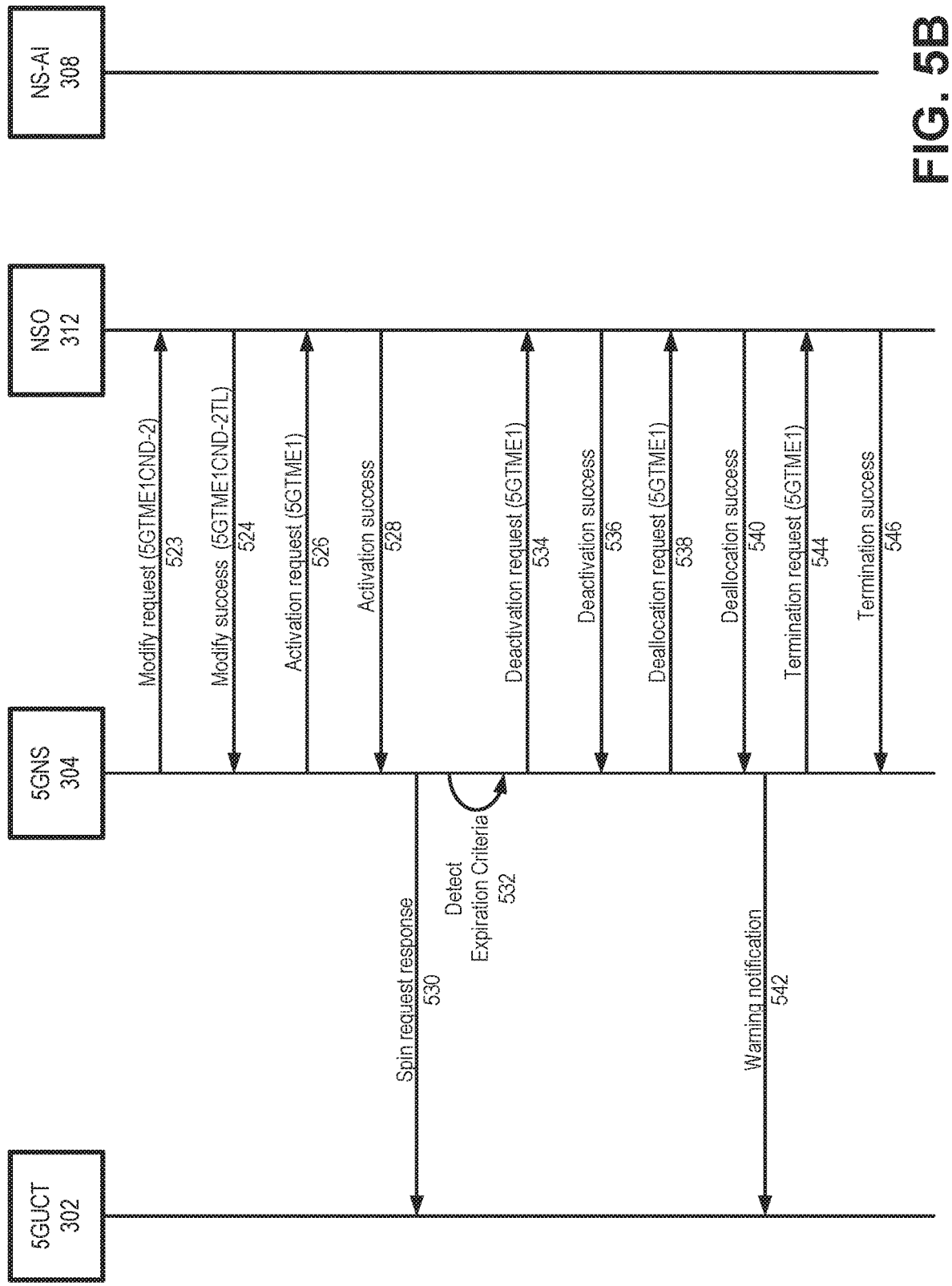

FIGS. 5A and 5B are signal flow diagrams illustrating communications among some components of network portion 300. FIGS. 5A and 5B provide simplified illustrations of communications and are not intended to reflect every signal or communication exchanged between devices/functions. Some communications in FIGS. 5A and 5B relate to instantiating a test mode environment and correspond to block 450 of FIG. 4A. Communications of FIG. 5A may begin after 5GNS 304 is unable to verify that a network segment associated with a test mode environment ID flag (e.g., 5GTME1) exists and informs 5GUCT 302 that 5GTME1 321 has not been created.

Referring to FIG. 5A, 5GUCT 302 may send a spin request 502 to 5GNS 304. Spin request 502 may include a corresponding slice identifiers for the test mode environment (e.g., 5GTME1), and update indicator (yes or no), and expiration criteria. The corresponding slice identifiers may correspond to production CNDs. In response to spin request 502, 5GNS 304 may fetch 504 corresponding CND templates (e.g., CND1, CND2, . . . CNDz) from NSO function 312.

5GNS 304 may send a busiest hour (BH) capacity check message 506 to NS-AI engine 308. BH capacity check message 506 may identify physical resources (PR1, PR2, . . . PRz) used in the production CNDs. In response to BH capacity check message 506, NS-AI engine 308 may provide actual availability projections 508 for the physical resources, based on historical network data and projections.

5GNS 304 may use the fetched templates from NSO function 312 and availability data from NS-AI engine 308 to derive a new test mode templates 510 (e.g., 5GTME1). For example, 5GNS 304 may alter the production CNDs to ensure consistency of the physical resources and reduce the required capacity to levels appropriate for testing. 5GNS 304 may also ensure test mode environments do not conflict with projected high demands in the production network. 5GNS 304 may send a create request message 512 to NSO function 312 to instantiate the different CNDs for 5GTME1 (e.g., TME1CND-1, TME1CND-2, . . . TME1CNDz). NSO function 312 may form the requested test mode CNDs and provide a confirmation message 514 to 5GNS 304. 5GNS 304 may then send an allocation request message 516 to NSO function 312 to allocate the different test mode CNDs to 5GTME1. NSO function 312 may allocate the requested test mode CNDs to 5GTME1, activate 5GTME1, and provide a confirmation message 518 to 5GNS 304.

Still referring to FIG. 5A, assume that spin request 502 includes an affirmative update parameter (e.g., Update=Yes). 5GNS 304 may read the update parameter and prompt 5GUCT 302 for a network update. More particularly, 5GNS 304 may send a get query 520 to 5GUCT 302 requesting an element, test load, and name. 5GUCT 302 may provide a get response 522 with the test load configuration information (e.g., for TME1CND-2).

Referring to FIG. 5B, 5GNS 304 may send a modify request message 523 to NSO function 312 to change the test load for TME1CND-2. NSO function 312 may upgrade TME1CND-2 with a test load (TL) configuration of TME1CND-2TL and provide a confirmation message 524 to 5GNS 304. 5GNS 304 may then send an activation request message 526 to NSO function 312 to activate 5GTME1. NSO function 312 may activate the 5GTME1 with TME1CND-2TL and provide a confirmation message 528 to 5GNS 304. Upon receiving confirmation message 528, 5GNS 304 may send a spin request response 530 to 5GUCT 302, confirming successful creation of 5GTME1 321.

Still referring to FIG. 5B, assume that spin request 502 includes expiration criteria that is monitored by 5GNS 304. The expiration criteria may include, for example, a period of inactivity, a time window, a fixed date and/or time, etc. 5GNS 304 may detect the expiration criteria 532 and trigger a self-destruction procedure when the expiration criteria from spin request 502 is met. For example, 5GNS 304 may send a deactivation request 534 to NSO function 312, indicating the particular test mode environment (e.g., 5GTME1). NSO function 312 may receive deactivation request 534, deactivate the CNDs for 5GTME1 321, and send a confirmation 536 to 5GNS 304.

5GNS 304 may then send a deallocation request 538 to NSO function 312, indicating the particular test mode environment (e.g., 5GTME1). NSO function 312 may receive deallocation request 538, deallocate the CNDs from 5GTME1 321, and send a confirmation 540 to 5GNS 304. Upon successful deallocation, 5GNS 304 may send a warning notification 542 to 5GUCT 302 and send a termination request 544 to NSO function 312. NSO function 312 may receive termination request 544, terminate 5GTME1 321, and send a confirmation 546 to 5GNS 304.

Figure 6:
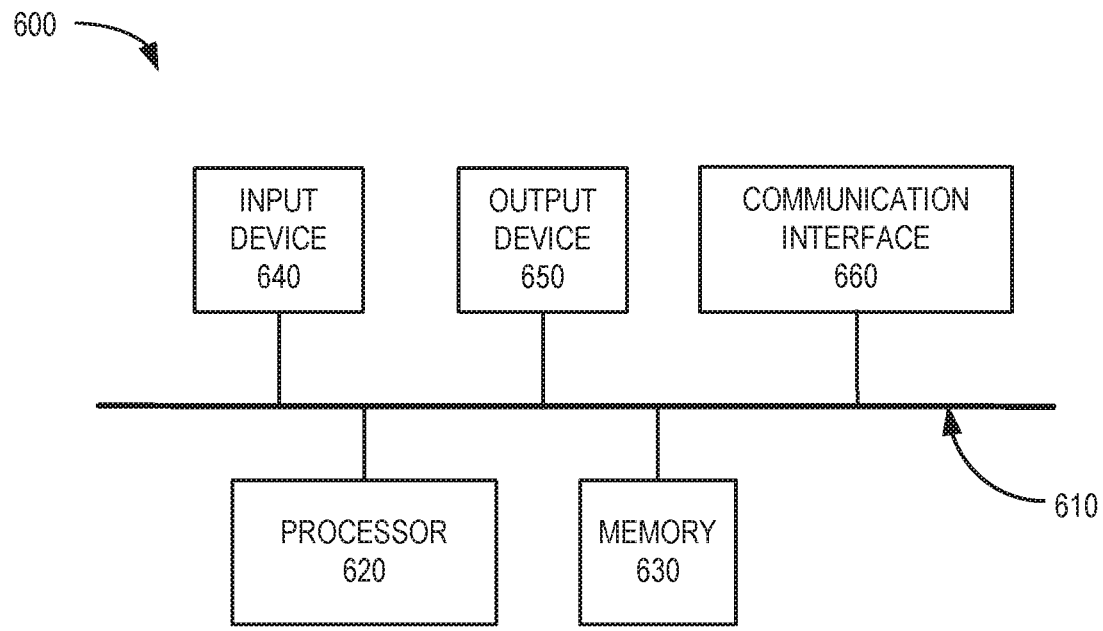
FIG. 6 is a diagram illustrating exemplary components of a device that may be included in a component of FIGS. 1-3B, according to an implementation described herein.

FIG. 6 is a diagram illustrating example components of a device 600 according to an implementation described herein. UE device 110, wireless stations 125, network devices 135, 5GUCT 302, 5GNS 304, 5GUS 306, NS-AI engine 308, NSO function 312, and/or other components of core network environment 100 may each include one or more devices 600. As shown in FIG. 6, device 600 may include a bus 610, a processor 620, a memory 630, an input device 640, an output device 650, and a communication interface 660.

Bus 610 may include a path that permits communication among the components of device 600. Processor 620 may include any type of single-core processor, multi-core processor, microprocessor, latch-based processor, and/or processing logic (or families of processors, microprocessors, and/or processing logics) that interprets and executes instructions. In other embodiments, processor 620 may include an application-specific integrated circuit (ASIC), a field-programmable gate array (FPGA), and/or another type of integrated circuit or processing logic.

Memory 630 may include any type of dynamic storage device that may store information and/or instructions, for execution by processor 620, and/or any type of non-volatile storage device that may store information for use by processor 620. For example, memory 630 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 640 may allow an operator to input information into device 600. Input device 640 may include, for example, a keyboard, a mouse, a pen, a microphone, a remote control, an audio capture device, an image and/or video capture device, a touch-screen display, and/or another type of input device. In some embodiments, device 600 may be managed remotely and may not include input device 640. In other words, device 600 may be "headless" and may not include a keyboard, for example.

Output device 650 may output information to an operator of device 600. Output device 650 may include a display, a printer, a speaker, and/or another type of output device. For example, device 600 may include a display, which may include a liquid-crystal display (LCD) for displaying content to the user. In some embodiments, device 600 may be managed remotely and may not include output device 650. In other words, device 600 may be "headless" and may not include a display, for example.

Communication interface 660 may include a transceiver that enables device 600 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 660 may include a transmitter that converts baseband signals to radio frequency (RF) signals and/or a receiver that converts RF signals to baseband signals. Communication interface 660 may be coupled to one or more antennas/antenna arrays for transmitting and receiving RF signals.

Communication interface 660 may include a logical component that includes input and/or output ports, input and/or output systems, and/or other input and output components that facilitate the transmission of data to other devices. For example, communication interface 660 may include a network interface card (e.g., Ethernet card) for wired communications and/or a wireless network interface (e.g., a WiFi) card for wireless communications. Communication interface 660 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 600 may perform certain operations relating to implementing lab-type testing over a segmented portion of a production network. Device 600 may perform these operations in response to processor 620 executing software instructions contained in a computer-readable medium, such as memory 630. A computer-readable medium may be defined as a non-transitory memory device. A memory device may be implemented within a single physical memory device or spread across multiple physical memory devices. The software instructions may be read into memory 630 from another computer-readable medium or from another device. The software instructions contained in memory 630 may cause processor 620 to perform processes described herein. Alternatively, hardwired circuitry may be used in place of, or in combination with, software instructions to implement processes described herein. Thus, implementations described herein are not limited to any specific combination of hardware circuitry and software.

Although FIG. 6 shows exemplary components of device 600, in other implementations, device 600 may include fewer components, different components, additional components, or differently arranged components than depicted in FIG. 6. Additionally, or alternatively, one or more components of device 600 may perform one or more tasks described as being performed by one or more other components of device 600.

Figure 7:
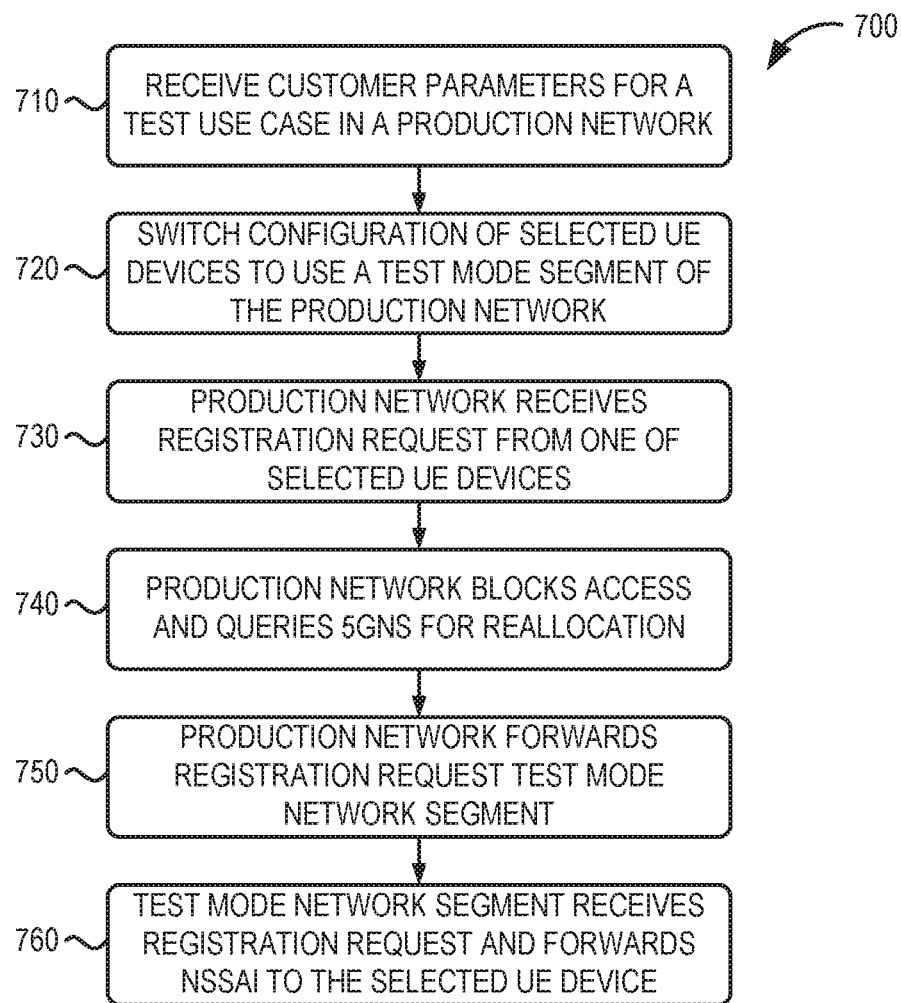
FIG. 7 is a flow diagram illustrating an exemplary process for assigning UE devices to a test mode network segment of a production network, according to an implementation described herein.

FIG. 7 is a flow diagram of an exemplary process 700 for assigning UE devices 110 to a test mode network segment of a production network. In one implementation, process 700 may be implemented by one or more of 5GUCT 302, 5GNS 304, or 5GUS 306. In another implementation, process 700 may be implemented by 5GUCT 302, 5GNS 304, and/or 5GUS 306 in conjunction with one or more other network devices in network portion 300.

Process 700 may include receiving customer parameters for a test use case in a production network (block 710). For example, 5GUCT 302 may provide a user interface for a customer to select customer test requirements for a use case, such as testing a new device, product, and/or service to be used. Customer device 350 may identify a combination of a production network slice and particular UE devices 110 for which testing is desired. In one implementation, customer device 350 may also identify a particular use case, test load, and/or test duration. 5GUCT 302 may receive the customer parameters and assign a test mode environment ID.

Process 700 may also include switching configurations of selected UE devices 110 to use the test mode segment of the production network (block 720). For example, based on customer input for selected UE devices 110, 5GUCT 302 may generate a switch request, such as switch request 402 described above. 5GUS 306 may receive the switch request and implement a DM node synchronization process, such as DM node synchronization 406/426, for each of the selected UE devices 110. The DM node synchronization process may set a flag for each selected UE device 110 to activate a test mode and identify the particular test mode environment ID.

Process 700 may further include receiving a registration request from one of selected UE devices 110 (block 730), and blocking UE device 110 access to the production network and querying a 5GNS 304 for reallocation of the registration request (block 740). For example, after the DM node synchronization process, a UE device 110 may provide a registration request, such as registration request 410/430, to a network device (e.g., an AMF) in production segment 320. Production segment 320 may detect the test mode flag and block UE device 110 from accessing production segment 320. Production segment 320 may, instead, provide a query, such as get query 412/432, to 5GNS 304 to identify the correct test network for the registration request based on the test mode environment ID.

Process 700 may additionally include the production network forwarding the registration request to the test mode network segment (block 750), and the test mode network segment receiving the registration request and forwarding NSSAI to the requesting UE device 110 (block 760). For example, 5GNS 304 may send to production segment 320 a network address corresponding to the test mode environment ID (e.g., get response 418/438). Production segment 320 may use the network address to forward (e.g., registration request 420/440) the registration request to the test mode network segment associated with the test mode environment ID that was provided with the registration request. The test mode network segment may accept the registration request by responding to the requesting UE device 110, such as by registration accept message 422/442.

Figure 8:
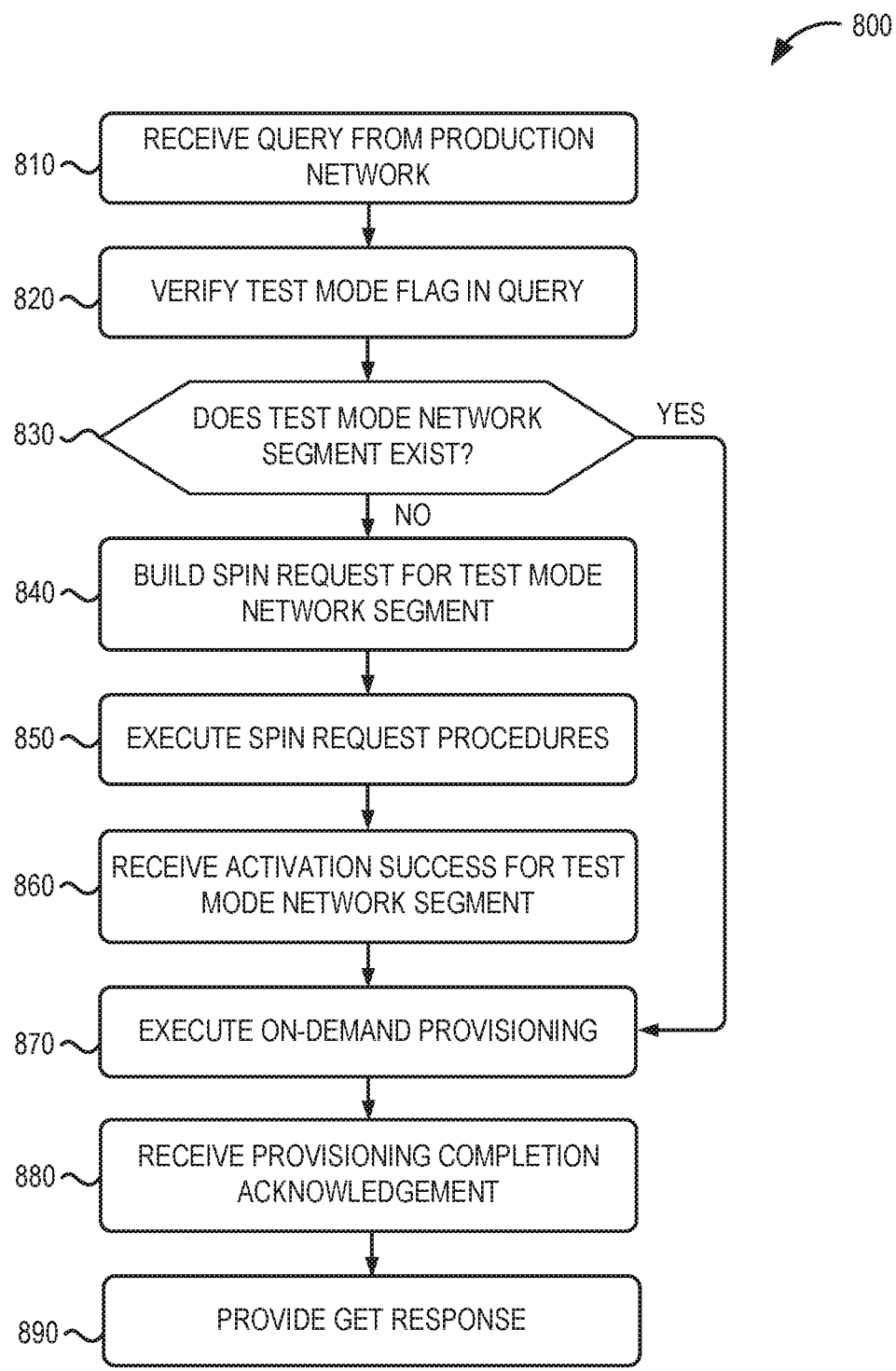
FIG. 8 is a flow diagram illustrating an exemplary process for creating a test mode network segment in a production network, according to an implementation described herein.

FIG. 8 is a flow diagram of an exemplary process 800 for creating a test mode network segment in a production network. In one implementation, process 800 may be implemented by one or more of 5GUCT 302, 5GNS 304, or NS-AI engine 308. In another implementation, process 800 may be implemented by 5GUCT 302, 5GNS 304, and/or NS-AI engine 308 in conjunction with NSO function 312.

Process 800 may include receiving a query from a production network (block 810) and verifying a test mode flag from the query (block 820). For example, as described above, a DM node synchronization process may cause a UE device 110 to perform a soft reset that triggers the UE device 110 to send a registration request to production segment 320. Production segment 320 detects the test mode flag and forwards the registration request, including the test mode flag and the test mode environment ID flag to 5GNS 304. 5GNS 304 may detect the test mode environment ID flag and verify that a corresponding test mode network segment exists.

If the test mode flag indicates a test mode segment does not exist (block 830—No), process 800 may include generating a spin request for the test mode network segment (block 840), executing spin request procedures (block 850), and receiving an activation success message for the test mode network segment (block 860). For example, as described in connection with FIG. 5A, 5GUCT 302 may provide a spin request 502 to 5GNS 304, which may communicate with NSO function 312 and NS-AI engine 308 to gather network information and create a new TME template for the test mode network segment (e.g., communications 504 through 518 of FIG. 5A).

If the test mode flag indicates a test mode segment does exist (block 830—Yes) or after receiving the activation success message in block 860, process 800 may further include executing on-demand provisioning (block 870), receiving a provisioning completion acknowledgement (block 880), and providing a get response to the production network (block 890). For example, as described in connection with FIG. 4B, 5GNS 304 may send a provisioning request, such as provisioning request 414/434, to the test mode network segment and receive a provisioning completion acknowledgement, such as acknowledgement 416/436. 5GNS 304 to may use information from the provisioning completion acknowledgement to provide a query response, such as response 418/438 to production segment 320.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of signal flows and blocks have been described with regard to the processes illustrated in FIGS. 4A-5B, 7 and 8, the order of the signal flows and blocks may be modified according to other embodiments. Further, non-dependent signal flows and blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 620, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 620) of a device. A non-transitory storage medium includes one or more of the storage mediums described in relation to memory 630.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method, comprising:
   receiving, by a test network management system, customer parameters for a use case in a production network, wherein the customer parameters include an identifier for a user equipment (UE) device to be tested with the use case;
   providing, by the test network management system and to the UE device, configuration information to associate the UE device with a test mode network segment of the production network;
   receiving, by a network device in the production network, a registration request from the UE device, wherein the registration request includes the configuration information;
   blocking, by the network device and based on the registration request, access by the UE device to the production network;
   initiating, by the test network management system and after the blocking, provisioning of the test mode network segment for the UE device; and
   redirecting, by the network device and after the initiating, the registration request to the test mode network segment.

2. The method of claim 1, wherein the redirecting comprises:
   providing, to the test network management system, a query including the configuration information; and
   receiving, from the test network management system, a query response with a network address for the test mode network segment.

3. The method of claim 1, further comprising:
   detecting, in the registration request and after the blocking, a test mode environment identifier;
   determining whether a test mode network segment, corresponding to the test mode environment identifier, exists; and
   initiating instantiation of the test mode network segment when the test mode network segment does not exist.

4. The method of claim 1, further comprising:
   initiating, by the test network management system and after the blocking, instantiation of the test mode network segment.

5. The method of claim 4, wherein initiating the instantiation further comprises:
   fetching customized network deployment (CND) templates for the use case;
   collecting projected availability information of physical resources associated with the CND templates;

deriving a template for the test mode network segment based on the CND templates; and sending an instantiation request to a network slice orchestrator based on the projected availability information.

6. The method of claim 1, wherein the configuration information includes a test mode flag and a test mode environment identifier, and wherein the registration request includes the test mode flag and the test mode environment identifier.

7. The method of claim 1, wherein providing the configuration information further comprises triggering a reset of the UE device.

8. The method of claim 1, further comprising:

receiving, by the test network management system, second customer parameters for another test use case in the production network, wherein the second customer parameters include the identifier for the UE device;

providing, by the test network management system and to the UE device, updated configuration information to associate the UE device with a different test mode network segment of the production network;

receiving, by the network device in the production network and based on the updated configuration information, another registration request from the UE device;

blocking, by the network device and based on the other registration request, access by the UE device to the production network; and redirecting, by the network device, the other registration request to the other test mode network segment.

9. The method of claim 1, further comprising:

receiving, by another network device in the test mode network segment, the redirected registration request; and sending, by the other network device and to the UE device, network slice selection assistance information (NSSAI) for the test mode network segment.

10. The method of claim 1, wherein the test network segment includes the same physical resources as the used in customized network deployments for the use case.

11. A system, comprising:

a test network management system including one or more network devices configured to:

receive customer parameters for a use case in a production network, wherein the customer parameters include an identifier for a user equipment (UE) device to be tested with the use case, and provide, to the UE device, configuration information to associate the UE device with a test mode network segment of the production network; and a network device in the production network configured to:

receive a registration request from the UE device, wherein the registration request includes the configuration information, and block, based on the registration request, access by the UE device to the production network, wherein the test network management system is further configured to initiate, after the blocking, provisioning of the test mode network segment for the UE device, and wherein the network device is further configured to redirect, after the initiating, the registration request to the test mode network segment.

12. The system of claim 11, wherein, when redirecting, the network device is further configured to:

provide, to the test network management system, a query including the configuration information; and receive, from the test network management system, a query response with a network address for the test mode network segment.

13. The system of claim 11, wherein the test network management system is further configured to:

detect, in the registration request and after the blocking, a test mode environment identifier;

determine whether a test mode network segment, corresponding to the test mode environment identifier, exists; and initiate instantiation of the test mode network segment when the test mode network segment does not exist.

14. The system of claim 11, wherein the test network management system is further configured to:

initiate, after the blocking, instantiation of the test mode network segment.

15. The system of claim 14, wherein, when initiating the instantiation, the test network management system is further configured to:

fetch customized network deployment (CND) templates for the use case;

collect projected availability information of physical resources associated with the CND templates;

derive a template for the test mode network segment based on the CND templates; and send an instantiation request to a network slice orchestrator based on the projected availability information.

16. The system of claim 11, wherein the configuration information includes a test mode flag and a test mode environment identifier, and wherein the registration request includes the test mode flag and the test mode environment identifier.

17. The system of claim 11, wherein the test mode network segment includes the same physical resources as the used in customized network deployments for the use case.

18. A non-transitory computer-readable medium containing instructions executable by at least one processor, the computer-readable medium comprising one or more instructions for:

receiving, by a network device in a production network, a registration request from a user equipment (UE) device, wherein the registration request includes configuration information to associate the UE device with a test mode network segment of the production network;

blocking, by the network device and based on the registration request, access by the UE device to the production network;

signaling, by the network device and after the blocking, a test network management system to provision the test mode network segment for the UE device; and redirecting, by the network device and after the provisioning, the registration request to the test mode network segment.

19. The non-transitory computer-readable medium of claim 18, further comprising one or more instructions for:

detecting, in the registration request and after the blocking, a test mode environment identifier;

determining whether a test mode network segment, corresponding to the test mode environment identifier, exists.

20. The non-transitory computer-readable medium of claim 19, further comprising one or more instructions for:

initiating instantiation of the test mode network segment when the test mode network segment does not exist.

\* \* \* \* \*